Feb. 7, 1950 J. S. HIGH 2,496,291
PNEUMATIC DUAL ROTARY VIBRATOR
Filed Jan. 3, 1947

INVENTOR.
JURJEN S. HIGH, DECEASED,
BY RIE HIGH EXECUTRIX

By
ATTORNEY

Patented Feb. 7, 1950

2,496,291

UNITED STATES PATENT OFFICE 2,496,291

PNEUMATIC DUAL ROTARY VIBRATOR

Jurjen S. High, deceased, late of Philadelphia, Pa., by Rie High, executrix, Philadelphia, Pa.

Application January 3, 1947, Serial No. 719,980

7 Claims. (Cl. 74—61)

(Granted under the act of March 3, 1883, as amended April 30, 1928; 370 O. G. 757)

This invention relates to a new improved rotary vibrator device, pneumatically driven, that is simple and of light weight, inexpensive to manufacture, easy to install and economical to operate, and also free from overheating at all speeds.

In many instances, as for example in fatigue testing of material specimens or in dynamic test of structures such as airplane wings, tail surfaces, and related parts, vibrations of various amplitudes and frequencies must be induced to observe the effect of said vibrations on the strength and fatigue life of the structures under test. In order to do this, it is often necessary to install and operate several vibrators simultaneously at various points upon the structure. In some instances, the desired mounting locations are difficult to reach with a flexible shaft for other types of mechanically driven vibrators.

The pneumatically driven vibrator of this invention requires only a flexible hose that can be carried through confined and angular passages in the various structures upon which it is desired to induce vibration. Because of its comparatively light weight and small and compact design for the dynamic effect produced, the device can be installed and operated in confined and almost inaccessible locations where it would be impossible to operate any other type of mechanically driven vibrator in a satisfactory manner.

A particular advantage of this pneumatic rotary vibrator is its light weight, because the lighter the weight, the less the interference encounterd with the natural vibration characteristics of the structure or material under test.

Because the rotors of this invention roll as a ball or roller and are driven by a blast of air impressed tangentially on them, there is no serious lubrication problem as encountered in other mechanical-type vibrators. Also this vibrator is cooled automatically by the airblast that drives the balls or rollers, so that the problem of overheating, as encountered in other forms of vibrators when operating under a heavy overload, is overcome.

A characteristic of the subject device is the inherent property of the two rotating balls or rollers, when driven either by the same air stream or by separate air streams, to roll in their respective retaining housings in automatically-synchronized step so as to produce a natural mode of vibration of the rectilinear type. This is due to the natural rhythmic motion of the cylindrical bearings provided by the metal case inside which each ball or roller moves, as each ball or roller revolves about its own axis of rotation while being held firmly on its circular bearing by centrifugal force.

This synchronized operation is accomplished automatically without any mechanical connection between the two separate rotating balls or rollers and without any controlling mechanism of the conventional type. There is no problem of lubrication, as the action of said balls or rollers is one of pure rolling motion without any sliding friction to cause heat and wear.

This pneumatic rotary vibrator can be used throughout the usual sub-resonant test range and through the ultra-resonance range by controlling the applied air pressure manually or with a pressure regulator, and by the selection of suitable size balls or rollers, thereby obtaining any desired test frequency or amplitude.

To summarize the advantages of this pneumatic vibrator, it is air-driven and thereby located easily in somewhat inaccessible places, it is of a compact, simple, and lightweight design, inexpensive to produce, reliable because of the elimination of flexible drive-shafts and couplings and shaft-mounted synchronizing gears and unbalanced weights found in other types of mechanical vibrators, and economical to operate and reliable because of the elimination of lubrication and overheating. It is controlled easily and quickly by simply changing the air pressure or the weights.

The principal object of this invention is to provide a pneumatic vibrator of simple, lightweight, lubrication-free construction as a means for producing vibrations of varying amplitudes and frequencies in an object to which the device is attached.

Another object is to provide a vibrator in which the unbalanced weights, being driven pneumatically, are synchronized with each other without the use of any mechanical connection and so produce rectilinear vibrations.

Another object is to provide a pneumatic vibrator as a means of producing vibrations of various amplitudes and frequencies in an object to which the device is attached, said vibrator having a source of power, in the form of air pressure, that allows location of the device in somewhat inaccessible places, such as places that would be difficult or impossible to reach with any mechanical-type vibrator having a flexible drive-shaft mechanism.

Still another object is to produce a pneumatic vibrator that will not fail because of overheating, cool operation resulting from the elimination of frictional mechanism and the use of an air stream as driving means.

These and other objects of this invention, and the various features and details of the construction, operation and use thereof, are hereinafter more fully set forth and described with reference to the accompanying drawing, in which like numbers refer to like parts, and in which Fig. 1 is an end elevational view of a preferred embodiment, a pneumatic vibrator having two cylindrical chambers carrying cylindrical rotating members, showing the exhaust-air passages in dotted lines;

Figure 3:
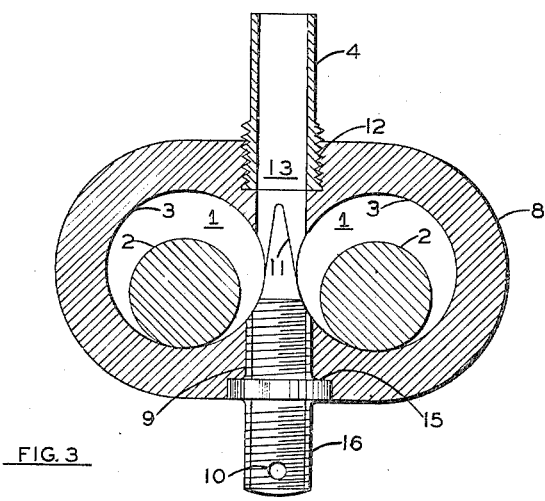
Fig. 3 is a transverse cross-section view on the center line of said air intake passage.
Figure 2:
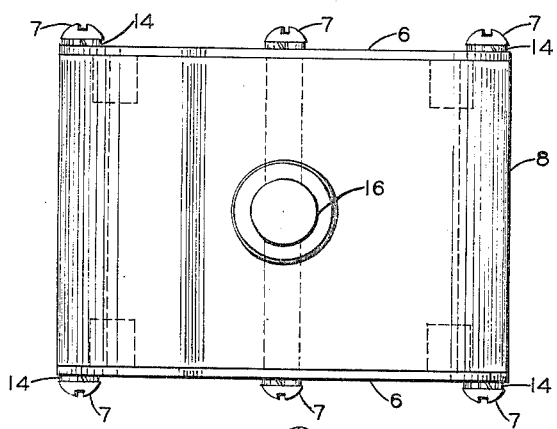
Fig. 2 is a top plan view showing the air intaake and end plates.
Figure 1:
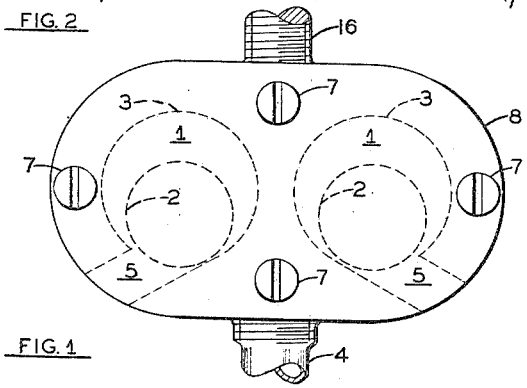

Numeral 2 designates the rotating weights of either a cylindrical or spherical shape, said weights rotating in chambers 1 of such shape as to provide a line contacts or tracks 3 for said rotating weights to bear against as they are rolled around by the flow of air entering the chambers 1 through fitting 4. Said flow of air, after pushing the rolling weights around their tracks passes out of the enclosing chambers 1 at ports 5, the said chambers 1 being closed at each end by covers 6 held in place by screws 7 in body 8 and washers 14.

Fig. 3 is a cross section taken through the vibrator on the center line of the air intake 4, which is threaded in housing 8 at tap 12. Air chambers 1 contain rotating weights 2, which are driven by an air stream entering through orifice 13 of intake 4, said air stream being diverted by splitter 11 of stud 9. Said stud 9 is screwed into housing 8 against counterbore 15 so that a substantially equal flow of air passes into each of the identical chambers 1, driving rotating weights 2 circumferentially about chambers 1 and exhausting through ports 5. Stud 16 is the means for attachment to the subject under test and hole 10 in said stud 16 permits the securing of a cotter pin therebetween. Rotating weights 2 can be either spherical or cylindrical in shape and their tracks 3 in housing 8 can be either spherical or cylindrical in shape to form a suitable bearing or track for said rotating weights 2 to follow.

This device can be built in any desired size so that vibrations of great magnitudes can be set up in large structures. For example, the device can be used to study and eliminate undesirable magnitude and frequency of vibration in battleships.

While a particular embodiment of this invention has been illustrated and described herein, it is intended that this invention be not limited to such disclosure, and changes and modifications can be made and incorporated within the scope of the claims.

The invention described herein may be manufactured and used by or for the Government of the United States of America for governmental purposes without the payment of any royalties thereon or therefor.

What is claimed is:

1. A pneumatically driven vibrator comprising a casing having a pair of round chambers arranged side by side symmetrically with respect to a central laterally directed inlet, a pair of round masses mounted loosely in said round chambers for rolling rotation therein, and tangentially arranged outlet ports for said chambers symmetrically arranged in said casing.

2. A pneumatically driven vibrator comprising a casing having a pair of cylindrical chambers arranged side by side symmetrically with respect to a central laterally directed inlet, a pair of cylindrical masses of the same length as said chambers but of smaller diameter mounted loosely in said round chambers for rolling rotation therein, and tangentially arranged outlet ports for said chambers symmetrically arranged in said casing.

3. A pneumatically driven vibrator comprising a casing having a pair of cylindrical chambers arranged side by side symmetrically with respect to a central laterally directed inlet, a pair of cylindrical masses of the same length as said chambers but of smaller diameter mounted loosely in said round chambers for rolling rotation therein, tangentially arranged outlet ports for said chambers symmetrically arranged in said casing and means for splitting the gases flowing thru the inlet and directing them tangentially equally into each of said chambers.

4. A vibrator comprising a casing having a pair of cylindrical chambers arranged symmetrically with respect to an inlet port communicating with said chambers, a pair of masses mounted loosely in said chambers for rolling rotation therein, and outlet ports for said chambers arranged symmetrically in said casing.

5. A vibrator comprising a casing having a plurality of cylindrical chambers arranged symmetrically with respect to an inlet port communicating with said chambers, a plurality of masses mounted loosely in said chambers for rolling rotation therein, and outlet ports for said chambers arranged symmetrically in said casing.

6. A vibrator comprising a casing having a plurality of cylindrical chambers arranged symmetrically with respect to an inlet port communicating with said chambers, a plurality of masses mounted loosely in said chambers for rolling rotation therein, and outlet ports for said chambers arranged symmetrically in said casing, said outlet ports being positioned substantially tangent to their respective chambers.

7. A vibrator comprising a casing having a plurality of cylindrical chambers arranged symmetrically with respect to an inlet port communicating with said chambers, means to subdivide a stream of fluid flowing into said inlet port and to direct such subdivided fluid into said chambers, a plurality of masses mounted loosely in said chambers for rolling rotation therein, and outlet ports for said chambers arranged symmetrically in said casing.

RIE HIGH,
Executrix of the Estate of Jurjen S. High, Deceased.

REFERENCES CITED

The following references are of record in the file of this patent:

UNITED STATES PATENTS

| Number | Name | Date |
|--------|------|------|
| 1,082,285 | Peterson | Dec. 23, 1913 |
| 1,346,221 | Liedke | July 13, 1920 |
| 1,397,058 | Schaumleffel | Nov. 15, 1921 |
| 1,459,841 | Mitchell | June 26, 1923 |
| 2,291,291 | Alexander | July 28, 1942 |